March 29, 1960

HIROSHI SUZUKAWA 2,930,298

FLASH SYNCHRONIZING APPARATUS

Filed Nov. 16, 1955

INVENTOR.
HIROSHI SUZUKAWA
BY
ATTORNEY

March 29, 1960  HIROSHI SUZUKAWA  2,930,298
FLASH SYNCHRONIZING APPARATUS
Filed Nov. 16, 1955  4 Sheets-Sheet 2

INVENTOR.
HIROSHI SUZUKAWA
BY
ATTORNEY

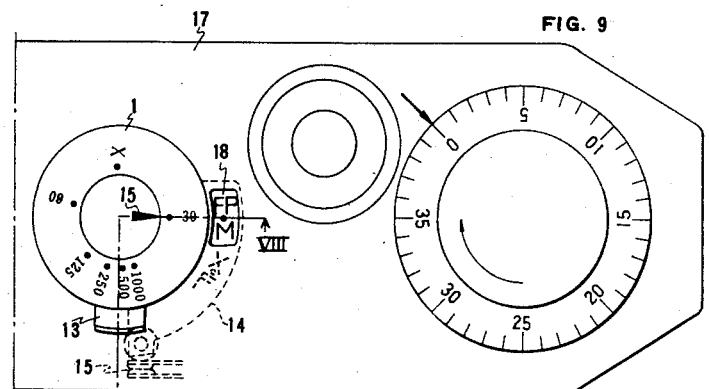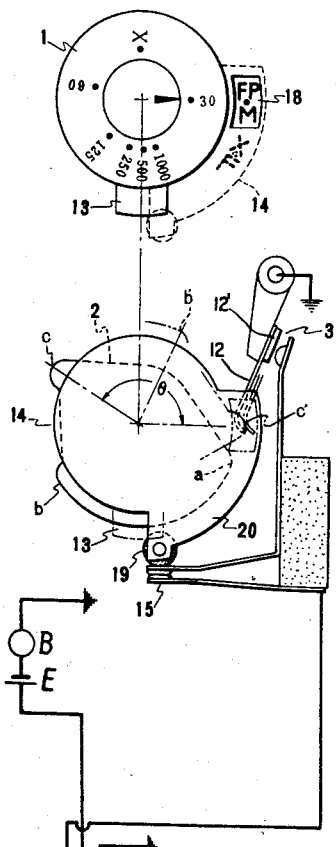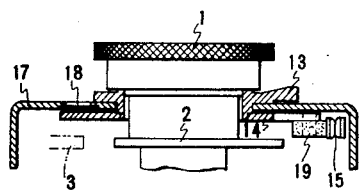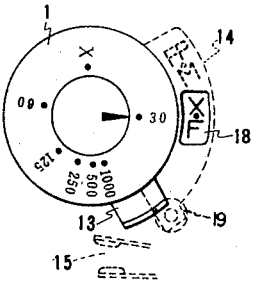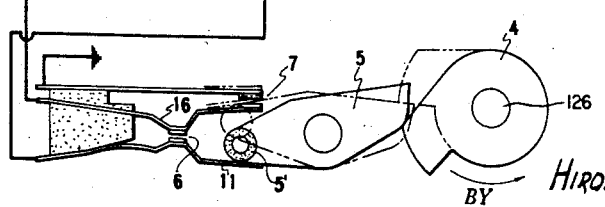

March 29, 1960  HIROSHI SUZUKAWA  2,930,298
FLASH SYNCHRONIZING APPARATUS
Filed Nov. 16, 1955  4 Sheets-Sheet 4
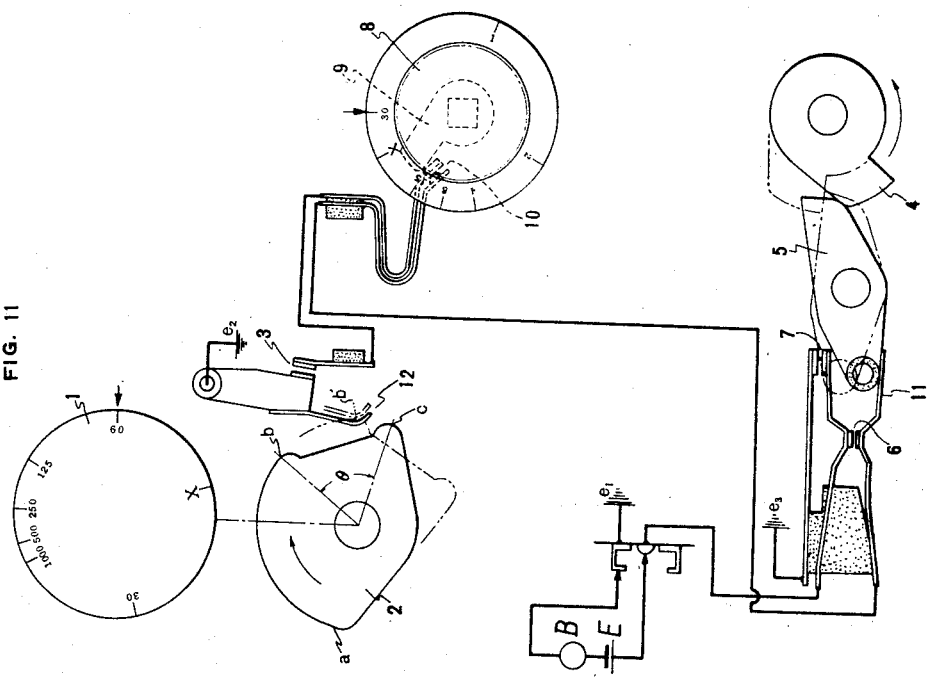
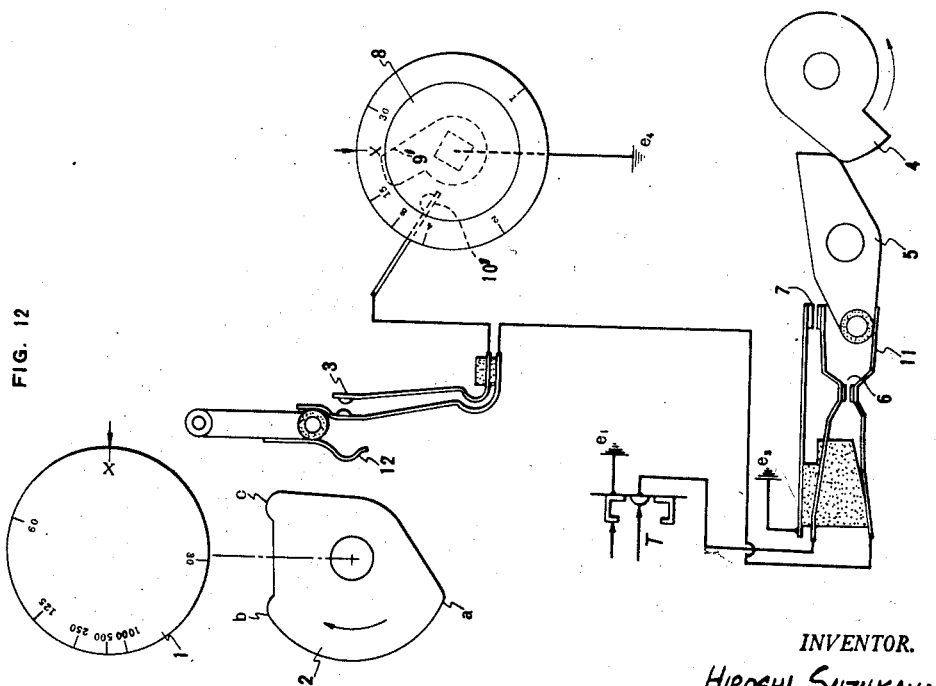
INVENTOR.
HIROSHI SUZUKAWA
BY
ATTORNEY.

United States Patent Office 2,930,298
Patented Mar. 29, 1960

2,930,298

FLASH SYNCHRONIZING APPARATUS

Hiroshi Suzukawa, Meguroku, Tokyo, Japan, assignor to Canon Camera Company, Inc., Otaku, Tokyo, Japan, a corporation of Japan Application November 16, 1955, Serial No. 547,218

Claims priority, application Japan December 23, 1954

5 Claims. (Cl. 95—11.5)

This invention relates to improvements in flash synchronizing apparatus for cameras, more particularly such apparatus incorporated in cameras with focal plane shutters consisting of a first and a second curtain.

An object of the invention is to provide a flash synchronizing mechanism for utilizing any and all conventional flashbulbs on the market selectively by a simple adjustment of a circuit member controlling the timing of the firing circuit to the proper one of a plurality of ranges of shutter speeds without requiring adjustment thereof to the particular speed within the range.

Another object of the invention is to provide a flash synchronizing mechanism of relatively simplified arrangement of a plurality of electrical switches interconnected selectively in series or in parallel to each other in such manner as to render inoperative the series connection thereof when the shunt or parallel circuit is to be actuated, the selectivity being in accordance with the particular exposure.

A further object of this invention is to provide a switch indication for synchronizing mechanisms built into focal plane shutter cameras of which the shutter is of the first and second curtain type.

Another object of this invention is to provide a circuit selector switch controlled automatically from a slow shutter dial, thereby simplifying the camera structure.

A clear concept of the scope and purpose of this invention may be obtained from the following description and the annexed drawing, in which:

Figure 7 shows the wiring diagram illustrative of the flash synchronizing mechanism of a preferred embodiment of the instant invention;

Figure 8 is an enlarged section on line VIII—VIII through the circular selector knob of Figure 9;

Figure 9 is a partial top view of the region of the camera housing the synchronizing mechanism of the instant invention;

Figure 10 is a partial plan view showing only the shutter speed dial and the circuit selector arm of the camera; and Figures 11 and 12 are modified illustrative embodiments of the synchronizing mechanism of the instant invention.

Figure 1:
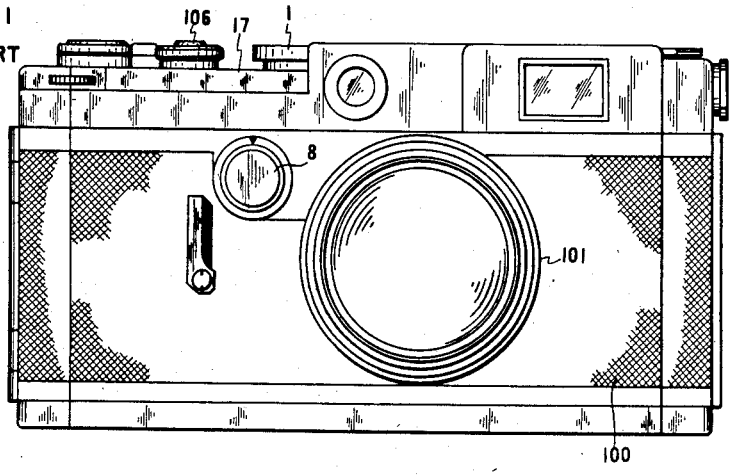
Figure 1 is a front view of one illustrative camera into which the mechanism of the instant invention is incorporated.

Referring to the figures of the drawing, in which like reference characters denote like parts throughout the figures, a camera provided with the flash synchronizing mechanism of the instant invention comprises essentially a conventional housing 100, an objective lens assembly 101 mounted in the front wall thereof, a film spool 102 and a film take-up spool 103 alike housed in conventional manner in both end regions of the housing, respectively, to permit the film passing between the spools across an exposure aperture 104 in the focal plane of the objective, a winding lever 105 provided on the top cover 17 of the camera housing to wind the shutter curtains, the latter being releasable to make exposures by depressing a shutter release button 106 on cover 17. When the lever 105 is turned, the film is wound for the requisite length. It is, however, apparent that further description of this action digresses from the scope and objects of the instant invention; hence this mechanism is not illustrated in detail and additional description is omitted.

A dial 1 is manually rotatable to set the exposure or shutter mechanism at a desired shutter speed within the high speed range, while another dial 8 is provided to control shutter speeds within the slow speed range.

Figure 3:
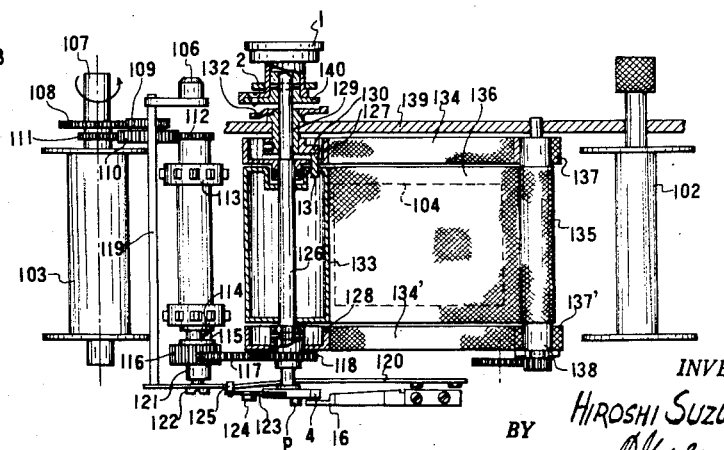
Figure 3 is a partial vertical section of the film winding and shutter operating mechanisms.

Referring now to Figure 3, stub shaft 107 is affixed to winding lever 105. Gear 108 is affixed to the lower end of shaft 107, gear 111 is integral with take-up spool 103, and gear 112 is integral with film advancing sprocket 113. By rotating shaft 107, gears 111 and 112 turn by way of intermediate gears 109 and 110. By swinging lever 105, sprocket 113 turns a gear 116 integral with shaft 121 through a clutch mechanism consisting of clutch pins 114 and 115. Gear train 116, 117 and 118, is so designed that the rotation of sprocket 113 to wind the film for the requisite length rotates gear 118 and also shaft 126, integral with gear 118, through an angle just sufficient to wind up, that is, tension, the shutter curtains.

Shutter curtain winding drums 127 and 128 are provided integral with shaft 126, and a second curtain winding drum 133 is rotatably disposed about shaft 126. A sleeve 129 having a radial projection 130 is rotatably provided between shaft 126 and a bearing of mechanism plate 139. Another projection 131 is provided on radial projection 130 in parallel with shaft 126 by way of annular grooves in the adjacent end faces of the shutter curtain winding drums 127 and 133. One end of each first curtain ribbon, 134 and 134', is connected to shutter curtain winding drums 127 and 128, respectively, and one end of the second curtain 136 is connected to second curtain winding drum 133. The other end of each first curtain ribbon is connected to first curtain 135 and rollable onto a roller 138 within which a spring is wound to tension the first curtain in well known manner. The other end of second curtain 136 is connected to second curtain rollers, 137 and 137', likewise provided with biasing springs therewithin to tension the second curtain. Rotation of shaft 126 for the requisite angle permits curtain winding drums 127 and 133 to rotate in concert by means of projection 131 which, in the shutter winding and releasing operation, engages the respective opposite ends of the annular grooves of curtain winding drums 127 and 133. A latching or cam member 4, affixed to the lower end of shaft 126, latches after tensioning the shutter curtains by means of one end of a bell crank 123 pivoted on camera housing 100 by means of pivot 124. The other end of bell crank 123 is provided with a cam-shaped projection 125 to engage with a relatively large plate spring 120 which is affixed to a bottom mechanism plate (not shown) at its other end by screws, for example as in Figure 3. To make an exposure, shutter release button 106 is depressed and then the lowermost end of release rod 119 depresses the free end of plate spring 120, which has an aperture to engage the head of screw 122 affixed to shaft 121 of gear 116, and thus clutch projection 115 is eventually released from its engagement with projection 114 by virtue of the lowered position of gear 116 and clutch projection 115. Now gear train 116, 117 and 118 is in the position ready to rotate urged by the tension of the first curtain ribbons 134 and 134' but is still prevented from so doing in that the bell crank 123 is engaged with latching member 4. With the continued depression of shutter release button 106, bell crank 123 turns to release from its latched condition with member 4 by the turning away of cam shaped projection 125 with the downward movement of plate spring 120. First curtain 135 thus commences to run down and shaft 126 eventually rotates.

Figure 2:
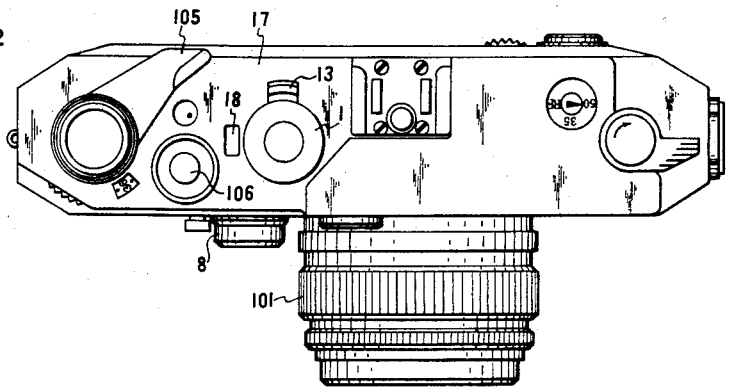
Figure 2 is a top view of the camera of Figure 1.

It will be noted that the exterior appearance of the camera illustrated in Figures 1 and 2 is conventional, constituting well known prior art in the field of miniature focal plane cameras, such as Canon Models II through V and certain models of the Leica camera which, together with other models of miniature cameras, are illustrated in the December 1956 issue of "Modern Photography," pages 64 to 103, particularly pages 69, 70 and 80. The camera mechanisms shown in Figure 3 are also prior known and are shown, for example, in British Patent 412,880, Figs. 4 and 5; British Patent 481,497, Figs. 1 and 3; U.S. Patent 2,682,815, Fig. 4; and U.S. Patent 2,643,597, Figure 2.

Flashbulbs now available on the market are of several types, differing from each other in their burning characteristics. The various types, of interest in connection with the instant invention, are classed "FP," "M," "F" and "S," as also the so called "electronic flash," "FP," and similar, class bulbs with a 10 to 13 millisecond time lag to half peak, have a very long light-emitting characteristic, while "M" class bulbs, as also bulbs similar thereto, with substantially a 20 to 22 millisecond time lag to peak, also have a relatively long light-emitting characteristic. "F," and similar, class bulbs with a short time lag to peak, say of 5 milliseconds, have a relatively steep light curve, that is, a relatively short duration of light emission, while "S," and similar, class bulbs have a relatively long light-emitting characteristic, that is, a long duration of the light emission. The electronic flash, or "speed light," having a relative scanty time lag, has a short duration of light emission, generally from 3 to 5 milliseconds.

The shutter shown in the illustrative embodiment comprises two curtains which run down independently of each other. For clarity of illustration and explanation, the shutter speeds, as mentioned throughout the specification and claims, are grouped in three categories, namely, a "high," a "medium" or "marginal," and a "slow" speed shutter range. By the high speed range, speeds of $\frac{1}{1000}$ sec., to $\frac{1}{60}$ sec., are meant; by the medium or marginal speed range, the speed of $\frac{1}{30}$ sec., is meant; while by the slow speed range speeds from $\frac{1}{15}$ sec., to one full second are meant. It is clear that shutter speed, in the case of the high speed shutter range, depends on the width of the slit between the first and second curtains of the shutters; the wider the slit the slower the shutter speed. For the shutter speed at which the width of the slit equals the length of the exposure aperture, a reference character "X" is marked on the shutter dial 1. To obtain a shutter speed of $\frac{1}{30}$ second or slower, the second curtain of the shutter is arranged to delay commencement of its run down on exposure by an appropriate retarding mechanism which times the appearance of the second curtain at the exposure aperture. A prior known device therefor is disclosed in British Patents 412,880 and 481,497 above mentioned.

An "FP" class flashbulb for focal plane shutter cameras has essentially a long light-emitting duration and therefore this characteristic can be utilized by flashing it almost simultaneously with the initiation of the movement of the first curtain for exposure so that synchronization is obtained at every high shutter speed within the specified ranged. This method of synchronization with "FP" class bulbs is definitely limited to the shutter speeds in the high speed range and is not applicable to slower shutter speeds, specifically to speeds slower than $\frac{1}{60}$ second. To overcome this difficulty, the relative time at which flashing occurs must be changed. This invention provides a synchronizing mechanism to utilize the long light-emitting characteristic of this class to its fullest extent and most efficiently, in that the relative time at which a bulb will be flashed for such slower speeds is automatically controlled by setting the shutter speed dial. More particularly, for the high speed shutter range the flash circuit switches on as soon as the shutter operation is initiated, while for both the medium shutter speed of $\frac{1}{30}$ second and the slow speed range, the time at which the bulb is fired is caused to vary in accordance with the particular shutter speed by providing a time lag adjusting contact operable by a time lag control cam mechanically coupled to, and rotatable with, speed dial 1.

Figure 4:
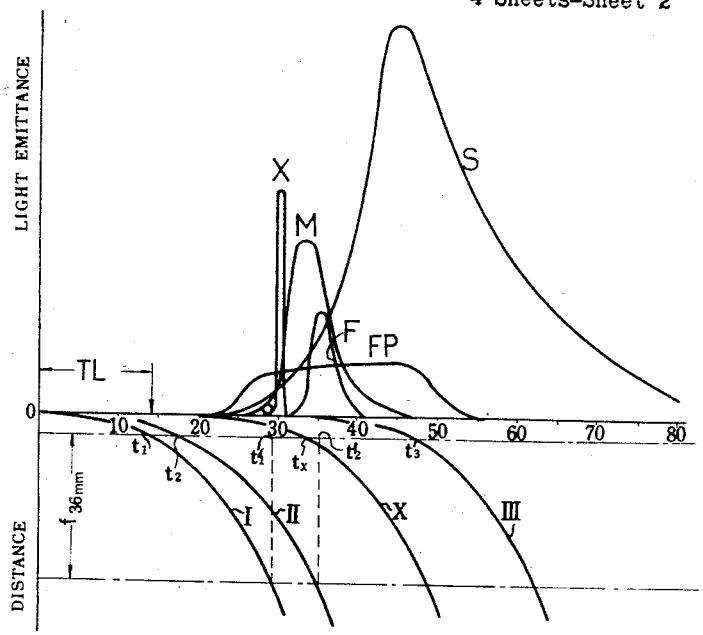
Figure 4 is a series of graphs showing the characteristic curves of flashbulbs of the various types with relation to the movement of the shutter curtains.

In Figure 4, the magnitudes given on the abscissa of the coordinates represent time in milliseconds. The upper portion of the ordinate axis represents light emittance, generally measured in lumens, while the ordinate axis portion below the abscissa represents distance in millimeters, that is, the displacement of the shutter curtains in making an exposure. The distance $f$ between the two chain lines corresponds to the length of the exposure aperture, which is 36 mm. in the camera of this embodiment. Curve I is the characteristic for the first curtain of the shutter, while curves II and III are characteristics for the second curtain at shutter speeds of $\frac{1}{250}$ second and $\frac{1}{30}$ second, respectively. Curve X of this group is the characteristic of the second curtain at the shutter speed $x$, the shutter speed at which the slit width equals the length of the exposure aperture. The characteristics for the second curtain at speeds slower than $\frac{1}{30}$ second are far to the right in Figure 4 and hence are not shown therein.

Referring to the graphs of Figure 4, the trailing edge of the first curtain, which forms the leading end of the shutter slit, starts to move at time 0 on depression of the shutter release button 106 and in a relatively short time reaches exposure aperture 104, for example, in the time interval $t_1$. The second curtain commences to move a predetermined time after the first curtain, which interval at a shutter speed of $\frac{1}{250}$ second may, for example, be 4 milliseconds. The second curtain commences to close the exposure aperture at time $t_2$, and eventually the shutter slit reaches the other end of the exposure aperture which is indicated by the lower horizontal chain line in Figure 4, at time $t_2'$. It should be noted that at this speed of $\frac{1}{250}$ second the slit width is less than the aperture length, that is, the exposure slit is not opened the full aperture length. At the shutter speed of $\frac{1}{30}$ second, however, the second curtain reaches the position of the exposure aperture at time $t_3$, an elapsed time which exceeds time $t_1$, the time at which the trailing edge of the first curtain reached the leading edge of the exposure aperture, so that the latter is left uncovered by the curtains of the shutter for a relatively long time interval from $t_1$ to $t_3$. It is thus apparent from Figure 4 that, if light emission is maintained from time $t_1'$, the time at which the trailing edge of the first curtain uncovers the trailing edge of the exposure aperture 104, to time $t_3$, the picture plane is uniformly illuminated at such shutter speed.

Repeated tests at various shutters speeds, of which the results are shown in Figure 4, in general teach the "FP" class bulbs give relatively satisfactory results in the speed range from 1/1000 second to 1/125 second on firing the bulbs at the moment the first curtain of the shutter commences its exposure movement. Plotting the graph for a shutter speed of 1/60 second, proves that high speed shutter switch firing is not applicable with "FP" bulbs at such speed, because this class of bulbs burns relatively too early for complete and instantaneous synchronization of the firing with the initiation of the exposure movement of the first curtain, so that the firing switch necessarily should be closed at a later time. Plotting the graph for the second curtain at the shutter speed of 1/30 second, demonstrates that the time of firing at that speed should be relatively later than that for the 1/60 second speed. Were he curves for shutter speeds slower than 1/30 second to be entered in Figure 4, they would demonstrate that for switch synchronization class "FP" bulbs would be appropriate for shutter speeds relatively slower than 1/30 second.

"F" class bulbs, as also the various electronic flash devices, have a steep light-emission characteristic and hence the exposure aperture should be uncovered for the entire duration of the light emission to produce a uniformly illuminated picture. It is thus apparent that the shutter curtain slit should be kept open the distance of the full length $f$ of the exposure aperture at the very moment of firing the bulb. Hence a slow shutter speed should be used when working with these classes of bulbs and electronic flashes. Electronic flash devices have time lags of comparatively insignificant duration and their characteristic, shown by graph X in the upper portion of Figure 4, is appreciably steeper than that of class "F" bulbs. Thus, if the flash circuit therefor is closed at about the time $t_1'$, shown on the time axis in Figure 4 by a small circle, the picture aperture is illuminated by substantially all the light emitted. Curve X of the lower portion of Figure 4 shows the motion of the second curtain at the particular speed which is determined by shifting the time $t_x$, the time at which the second curtain reaches the position of the exposure aperture, to be in close proximity to the light emission characteristic X of the electronic flash. In the instant embodiment, shutter speed $x$ is at about 1/50 second. "F" class bulbs have a time lag of about 5 milliseconds, so that the switch used for the electronic flash device is also available for use with "F" class bulbs in the slow speed range of the shutter.

The difficulties arising out of the varying characteristics of artificial light sources available for photography, are overcome in the mechanism of the instant invention by providing three conventional switches in the synchronizing circuit such that a first switch actuates the circuit to fire the flash bulb or light when the first curtain commences to move on exposure (this switch being hereinafter called the "high speed shutter" switch), a second switch operates the circuit to fire when the shutter speed is 1/60 second or 1/30 second (which second switch is hereinafter termed the "medium speed shutter" switch), and the third switch operates to fire at time $t_1'$, or, more specifically, at the time indicated in the graph of Figure 4 by the small reference circle (this switch being hereinafter termed the "slow shutter speed" switch).

In Figures 5, 7, 11 and 12, the high shutter speed switch 6 closes by the bias per se of a spring switch member 11 when cam 4 commences to rotate counter-clockwise on initiation of the exposure movement of the first curtain of the shutter, cam 4 being carried by shutter curtain winding drum shaft 126 as above described. To rotate in unison with shutter speed dial 1, a lag adjusting cam 2 is mechanically coupled to dial 1 and is of such shape as readily and slidingly to engage, and be disengaged from, the free end of an arm 12 carrying an electrical contact 12' and pivoted at one end 12" to the camera body and electrically grounded, $e_2$, at the pivoted region. Cam 2 is of such shape and spatially so positioned relative the speed markings on dial 1 that a peripheral arcuate surface, from a region $a$ to a region $b$ at a maximum radius from the cam axis, will engage the free end of arm 12 and close contact 12' on cooperating contact 3 for all shutter speed settings on dial 1 from 1/1000 second to 1/125 second (Figure 5); the free end of arm 12 will be disengaged from the cam and extend into a peripheral detent of the cam between the region $b$ and a region $c$ spaced therefrom, region $c$ per se being at the maximum radius of the cam, for a shutter setting of the dial to 1/60 second (Figure 6), thus opening the engaged contacts 12' and 3 and closing such contacts on each other as the cam rotates and the free end of arm 12 strikes region $b$. The free end of arm 12 is likewise disengaged from the cam periphery for a shutter speed setting of 1/30 second or less, and hence contacts 12' and 3 are disengaged, because the lag cam is truncated along chords of a circle of a radius less than the maximum radius of the cam from region $c$ thereof to region $a$ (Figure 7), with the contacts 12' and 3 engaging each other when the rotation of the cam causes cam region $c$ to strike arm 12. Arm 12 is biased by an appropriate spring, not shown, to tend always to engage the innermost peripheral cam regions, thus opening the contact 12' from contact 3 unless the free end of the arm engages a cam region of the maximum radius of the cam, namely the arcuate surface from region $a$ to region $b$, the immediate vicinity of region $c$ and the immediate vicinity of region $a$. Electrical contact 3 is insulatingly supported in camera housing 100, and is electrically connected to spring element 11 of the high speed shutter switch 6, held in open position when the shutter is wound up, by insulating projection 5' on lever 5. The other terminal of switch 6 is electrically connected to the external electrical terminal T (Figure 5) within, and insulated from, a bracket C for connecting a flashbulb battery E and a flashbulb B, bracket C being grounded at $e_1$. The peripheral arcuate region from $a$ to $b$ of the lag cam encompasses the high shutter speed range from 1/1000 to 1/125 second, and closes contact 12' upon contact 3 immediately upon commencement of the movement for exposure of the first curtain of the shutter when the dial has been set for any shutter speed in such range. It must be noted that another switch should additionally be included in the firing circuit to prevent firing of the flashbulb while tensioning the shutter preparatory to making an exposure. Since the use of such switch and its operation are obvious and of no appreciable bearing on the instant invention, a detailed description thereof is omitted for the sake of clarity as to the instant invention.

Figure 5:
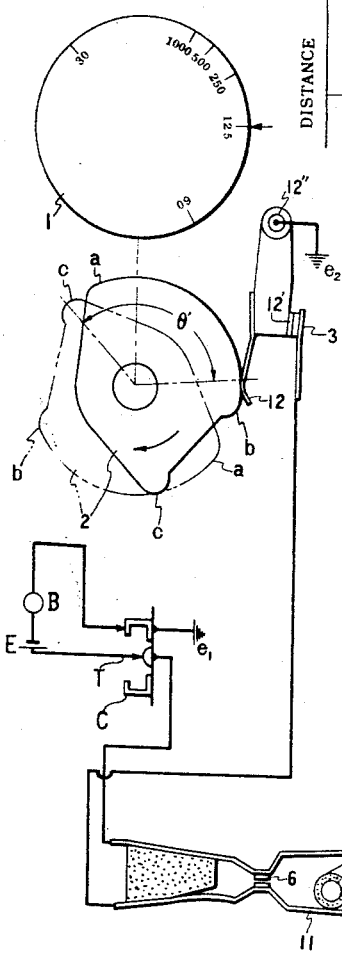
Figure 5 is a schematic of an illustrative embodiment of a flash synchronizing mechanism, and more particularly a switch controlling mechanism as positioned for "FP" class bulbs for the high and medium shutter speed ranges.

The full line showing of cam 2 in Figure 5 discloses the position of the essential elements of the instant invention with the shutter fully tensioned, that is, wound up, and dial 1 adjusted for a shutter speed of 1/125 second. It will be noted cam 2 engages arm 12 which closes contact 12' upon contact 3. Hence, when now the shutter release button 106 is depressed to make the exposure, cam 4 moves in the counterclockwise direction as shown by the arrow, and lever 5 is released and swings clockwise, under the tension of element 11, to close the high speed shutter switch 6 in a relatively short time. There results the closed circuit $e_1$—C—B—E—T—6—11—3—12'—$e_2$, firing the bulb. While high speed shutter switch 6 thereafter remains closed, until the shutter is again tensioned for a subsequent exposure, the free end of arm 12 will disengage from the cam periphery after rotation of the cam 4 through the angle $\theta'$, which is somewhat larger than the central angle subtended by arc $ab$, when region $a$ leaves arm 12, thus reopening and disengaging contact 12' from contact 3.

Figure 6:
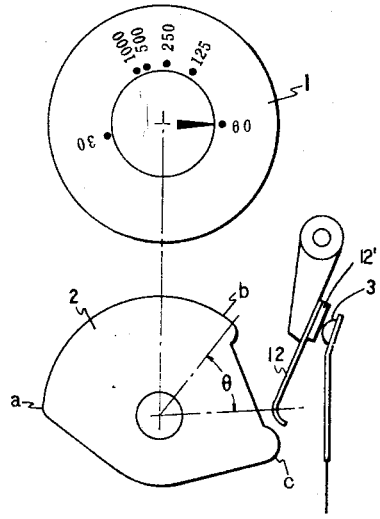
Figure 6 is a simplified showing of a medium speed shutter switch.

To retard the time of complete closure of the firing circuit for an interval of time after the initiation of the first shutter curtain movement, such interval of time being appropriate to synchronize the exposure aperture opening with the firing of the bulb, for the shutter speed of 1/60 second, on setting the speed dial for this speed and fully tensioning, or winding, the shutter for exposure, shoulder *b* of lag cam 2 is in the position shown in Figure 6. The free end of arm 12 now extends into the detented or depressed peripheral region from *b* to *c* of cam 2 and thus contact 12' is disengaged from contact 3. The central angle $\theta$, between the radii of the cam respectively to the free end of arm 12 and the cam region *b*, is of such predetermined magnitude as to obtain the required retardation of firing circuit closure after commencement of the first curtain movement in the exposure direction. Obviously as cam 2 rotates, region *b* engages the free end of arm 12 to close contact 12' on contact 3 when cam 2 has rotated through the angle $\theta$, thus firing the bulb since the circuit was closed at high speed shutter switch 6 in the initial stage of the exposure operation, as above described.

For shutter speeds of 1/30 second and slower, the retardation of the switching time to complete the firing circuit by utilizing the detented region *b* to *c* of cam 2, proves a little too short. The modified embodiment, shown schematically in Figure 7, discloses the setting of the elements with the shutter speed set at 1/30 second and the shutter fully wound, or tensioned, and ready for an exposure. The free end of arm 12 extends toward cam 2 at the truncated cam region between region *a* and region *c*, so that the contact 12' remains spaced from contact 3 for the time taken by cam 2 to rotate through angle $\theta$ until projection *c* engages such free end of arm 12. It will be noted that in this Figure 7 embodiment another contact switch 15 is inserted between contact 3 and spring element 11 mounting the contacts of switch 6. The contacts of switch 15 are supported on spring terminals which are biased so as to discharge the contacts 15 from each other, and are closable on each other by being engaged by projection 19, of insulating material, on a switch plate 14 coaxial with the axis of cam 2. Furthermore, a make and break contact 7 has one of its contacts supported at the free end of the spring terminal 16 which at an intermediate portion of its opposite face carries one of the contacts of the make and break high speed shutter switch 6. The other contact of make and break switch 7 is supported at the free end of an additional spring terminal which is grounded. Both make and break contact sets, 7 and 6, are normally open and are both closable by projection 5', of electrical insulating material, as cam 4 is rotated in the exposure direction, contact set 6 being so closed at the initiation of the movement of the first curtain while contact set 7 is closed at a later portion of the shutter movement, namely at substantially the time at which the whole length of the exposure aperture has just been uncovered by the first curtain.

The switching lag for a shutter speed of 1/30 second is designated TL in Figure 4 and, as there shown, lag TL is also appropriate for "M" class bulbs at speeds of 1/30 second or slower.

As illustrated in Figures 8 and 9, a selector arm or tab 13 is provided coaxially with dial 1, and in one region of switching plate 14 two sets of characters, namely "FP·M" and "X·F" are applied. An opening 18 is provided in camera top 17 through which the characters on switching plate 14 may be read. Selector arm or tab 13 may be provided at a different position, not coaxial with dial 1, and the characters thereon may be selectively registered with a reference mark or arrow on the camera body instead of registering with opening 18. Turning switching plate 14 by means of projecting tab 13 to register the characters "X·F" with opening 18, insulating projection 19 leaves contacts 15 which spring open, and thus both the high speed shutter switch 6 and the medium speed shutter switch, 12'—3, alike are rendered ineffective to fire the flash circuit. The shape of cam 4 is such that when the first curtain completely uncovers the exposure aperture 104, the projection 5' closes the slow speed shutter switch 7. Thus, to fire the flash circuit by way of slow speed switch 7, projecting tab 13 is rotated until the characters "X·F" may be read through opening 18 and thereupon the shutter is tensioned. Depressing shutter release button 106 for the exposure, cam 4 commences to rotate just as in the cases where the shutter speed dial 1 is set for high shutter speed firing. The high speed shutter switch 6 closes immediately but the firing circuit remains inoperative since the selector switch 15 is open. Similarly, the medium speed shutter switch, lever 12 and contacts 12' and 3, is rendered ineffective to close the firing circuit. However, just as the first curtain completely uncovers the exposure aperture, cam 4 re-engages lever 5 to pivot it still further and positively in the clockwise direction so that insulating projection 5' forces spring element 16 upwardly, and closes its contact of slow speed shutter switch 7 upon the grounded contact thereof thus completing the firing circuit from ground, 7, E, B, to ground and flashing the bulb.

Each of Figures 11 and 12 is a modification of the illustrative embodiment of the invention shown in Figure 7. The slow shutter speed dial 8 has a radial arm 9 attached to its shaft controlling a set of contacts 10 to change over the flashing circuit, instead of the selector switch 15 controlled by switching plate 14. An insulating material is provided between switch 10 and radial arm 9, or alternatively, radial arm 9 may be made of an electrical insulating material. In both these modified embodiments, the shutter speed character X, which is the marking for the speed at which the exposure aperture is completely uncovered by the first curtain before the second curtain of the shutter commences to recover such exposure aperture, appears on the slow speed shutter dial 8. This arrangement is highly effective since the slow shutter speed dial 8 can readily at all times adjust the slow speed shutter switch. It will be noted that, as shown in Figure 11, contact switch 10 closes for a setting of 30, that is a speed setting of 1/30 second, on dial 8. For a shutter speed X, or for speeds even slower, switch 10 is open, causing the high speed switch 6 to remain ineffective to fire the bulb even though the latter switch is operated to closure by the release of spring terminal 11 thereof at the commencement of the exposure movement of the shutter. In the modification of Figure 12, the conductive radial arm 9' is grounded at $e_4$ and is adapted to close upon single contact 10', connected to contact 3, to ground the latter when the slow speed shutter dial 8 is, as above stated, set at 30, or if set at a slower speed to ground contact 3 when the radial arm 9' engages contact 10' during the exposure movement of the shutter. The operation of both these modifications is readily understood from the detailed description of the operation of the embodiment of Figure 7.

What I claim is:

1. A photoflash synchronizing mechanism for cameras of the focal plane shutter type having a first and a second curtain, curtain winding and release means, at least one time exposure setting dial interconnected with the curtain winding and release means, and a film advancing means, for firing a flash bulb selectively at any of three different intervals after the commencement of curtain movement in the exposure direction, comprising first switching means including a rotatable member, means for selectively positioning the rotatable member to switch closed position, to a switch first open position closable after a first relatively short interval of time, and to a switch second open position closable after a second relatively long time on winding the curtain for an exposure, means interconnecting the rotatable member in driven relation with the curtain winding and release means, a second switching means having a pair of spring terminals, an electrical connection from the first switching means to one of the spring terminals of the second switching means, displacing means controlled by the curtain winding means acting on the spring terminal of the second switching means connected to the first switching means maintaining the second switching means open when the curtain is wound preparatory to exposure and releasing the terminal on exposure movement of the curtain as the curtain commences to uncover the exposure aperture, and a source of potential and a socket adapted to receive a flash bulb serially connected between the other of the pair of spring terminals of the second switching means and a grounded connection, whereby on operation of the curtain release means the displacing means permits the second switching means to close to fire the bulb in the socket on the commencement of uncovering of the exposure aperture when the rotatable member of the first switching means is positioned at the time of release of the shutter in the first switching means closing position, while such bulb remains unfired at such commencement when the rotatable member at such time is in either of the two open but closable positions and is fired only after the rotatable member is driven by the curtain winding and release means as the curtain unwinds to close the first switching means after a short interval after such commencement when the rotatable member originally was in the first switch open but closable position and after a long interval after such commencement when the rotatable member originally was in the switch second open but closable position after such commencement and closure of the second switching means.

2. A photoflash synchronizing mechanism according to claim 1 having a third switch in series in the electrical connection between the first switching means and the one spring terminal of the second switching means, the third switch having a pair of spring terminals biased away from each other, a plate rotatable on the axis of the rotatable member of the first switching means selectively to maintain the third switch closed for at least one type of bulb to be used in the socket and permitting the third switch to spring open for at least a second type of bulb, a fourth normally open switch having one contact thereof supported on the other terminal of the second switching means and its other contact on a third grounded spring terminal, and the displacement means on continued movement under the control of the shutter exposure movement at the time when the exposure aperture is first completely uncovered closes the fourth switch, whereby the third switch being open, the first switching means is ineffective at all times, the closure of the second switching means does not fire such bulb in such socket and the closure of the fourth switch fires such bulb; while when the third switch is closed, closure of the second switching means fires such bulb on such commencement providing the rotatable member of the first switching means is positioned at the time of release of the shutter in the first switching means closing position but does not fire such bulb on such initiation when such rotatable member at such time is in one of the first and second open but closable positions and fires such bulb only after the rotatable member is rotated by the unwinding of the shutter to close the first switching means after a short, and a long, interval of time respectively, after such commencement and after the closure of the second switching means.

3. A photoflash synchronizing system according to claim 1 in which the camera has a high shutter speed setting dial and a slow shutter speed setting dial both interconnected with the curtain winding and release means, a third switch is interposed in the electrical connection between the first switching means and the one spring terminal of the second switching means, the third switch consisting of a spatially relatively fixed terminal having at least one contact and an arm integral on the rotatable axis of the slow shutter speed setting dial and so positioned on the dial axis as to engage the spatially relatively fixed terminal of the third switch to close the latter at the setting of the slow speed dial at a predetermined slow shutter speed when the shutter has been wound preliminary to exposure and spaced at increasing distances therefrom with increasingly slower speeds below the predetermined slow shutter speed to maintain the third switch open with the switch so wound, a fourth normally open switch having one contact thereof supported upon the other spring terminal of the second switching means and its other contact on a third grounded spring terminal, and the displacement means on continued movement under the control of shutter movement in the exposure direction at the time when the exposure aperture is first completely uncovered, closes the fourth switch, whereby the third switch being open, the first switching means is ineffective at all times, the closure of the second switching means does not fire such bulb in such socket and the closure of the fourth switch fires such bulb, while when the third switch closes on rotation of the radial arm to engage the spatially relatively fixed terminal such bulb is fired.

4. A photoflash synchronizing system according to claim 3 in which the radial arm of the third switching means is electrically conductive and grounded.

5. A photoflash synchronizing mechanism, particularly for cameras of the focal plane shutter type having at least one shutter speed setting dial, for selectively firing flash bulbs at a plurality of at least three predetermined time intervals after the initiation of shutter movement in the exposure direction, comprising a first switching means having a rotatable member having three predetermined peripheral regions of which the first is arcuate and at a maximum distance from the axis of the rotatable member, the second region is a projection of the same maximum distance from such axis and spaced from one end of said first region and an intervening portion in the form of a peripheral indenture, and the third portion is a second peripheral indenture from the projection to the other end of the first region, a first electrical contact biased to engage the periphery of the rotatable member, a ground connection to the first electrical contact, and a fixed second electrical contact, mechanical means interconnecting the rotatable member in driven connection with at least one of the shutter speed setting dials of the camera, and the shutter winding and release thereof, whereby on tensioning the shutter for an exposure one of the three peripheral regions of the rotatable member is adjacent to the first contact, the first arcuate region having a length such that for all high shutter speeds the first contact engages the second contact, the second region of the rotatable member having a length such that for at least one predetermined intermediate shutter speed the first contact is adjacent to the indenture thereof and is out of engagement from the second contact, and the third region thereof having a length from the projection to the other end of the first region that for all speeds less than the predetermined intermediate shutter speeds the first contact extends into the second indenture and is out of contact from the second contact, a second switching means having a pair of terminals of which at least one is a spring terminal, and a third and fourth contact adapted to close upon each other of which the third contact is supported at an intermediate region of the spring terminal, a displacing member of insulating material maintaining open the second switching means by engaging the free end of the spring terminal in opposition to its bias on such film winding, an electrical connection from the second contact to the third contact, a source of electrical potential and a socket adapted to receive a flash bulb connected between the other terminal of the second switching means and ground, and means controlled by the motion of the shutter on exposure movement to release the displacing member to permit the second switching means to close as the camera exposure aperture is just being uncovered and to rotate the rotatable member whereby when the first contact at the time of shutter release is adjacent to the first region of the rotatable member a bulb in the socket is immediately flashed, while when such first contact at such release time is adjacent to the second region of the rotatable member such bulb is fired only after the rotatable member has rotated sufficiently to move the indenture of the second region away from the first contact and to engage the adjacent end of the first region to the first contact to close the first contact upon the second contact, and when the first contact at such release time is opposite the third region such bulb is fired only when the rotatable member has rotated sufficiently to move the second indenture away from, and to engage the other end of the first region of the rotatable member to, the first contact.

References Cited in the file of this patent

UNITED STATES PATENTS

| | | |
|---|---|---|
| 2,552,213 | Pribus et al. | May 8, 1951 |
| 2,590,829 | Wagner | Mar. 25, 1952 |
| 2,596,671 | Fuerst | May 13, 1952 |
| 2,643,597 | Suzukawa | June 30, 1953 |
| 2,646,734 | Wagner et al. | July 28, 1953 |
| 2,682,815 | Gasser | July 6, 1954 |

FOREIGN PATENTS

| | | |
|---|---|---|
| 891,493 | Germany | Sept. 28, 1953 |